(12) United States Patent
Makiguchi

(10) Patent No.: US 10,135,967 B2
(45) Date of Patent: *Nov. 20, 2018

(54) INVALID AREA SPECIFYING METHOD FOR TOUCH PANEL OF MOBILE TERMINAL

(71) Applicant: NEC CORPORATION, Tokyo (JP)

(72) Inventor: Tomoya Makiguchi, Saitama (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/819,026

(22) Filed: Nov. 21, 2017

(65) Prior Publication Data

US 2018/0097929 A1 Apr. 5, 2018

Related U.S. Application Data

(63) Continuation of application No. 15/002,467, filed on Jan. 21, 2016, now Pat. No. 9,843,664, which is a
(Continued)

(30) Foreign Application Priority Data

May 2, 2011 (JP) ................................ 2011-102784

(51) Int. Cl.
*H04M 1/00* (2006.01)
*H04M 1/725* (2006.01)
(Continued)

(52) U.S. Cl.
CPC ........ *H04M 1/72577* (2013.01); *G06F 1/169* (2013.01); *G06F 1/1626* (2013.01);
(Continued)

(58) Field of Classification Search
CPC .... G06F 3/0487; G06F 3/0488; G06F 1/1626; G06F 1/169; H04M 1/72577; H04M 1/72569
(Continued)

(56) References Cited

U.S. PATENT DOCUMENTS 5,777,605 A 7/1998 Yoshinobu
6,469,695 B1 10/2002 White
(Continued)

FOREIGN PATENT DOCUMENTS

EP 2175344 A2 4/2010
JP 6214718 A 8/1994
(Continued)

OTHER PUBLICATIONS

Decision to Grant a Patent, dated Oct. 24, 2017, issued in Japanese Application No. 2016-187563, 6 pages in English and Japanese.
(Continued)

*Primary Examiner* — Charles Shedrick
(74) *Attorney, Agent, or Firm* — Sughrue Mion, PLLC

(57) ABSTRACT

A touch-panel cellular phone specifies an invalid area not accepting a user's input operation on a touch panel in advance. The cellular phone detects a user's touch area on the touch panel so as to execute a function pre-assigned to the touch area not encompassed by the invalid area. Additionally, it is possible to reduce and display menu icons in the display area precluding the invalid area on the touch panel. Thus, it is possible to prevent an error operation when a user holding a cellular phone inadvertently touches the touch panel.

10 Claims, 8 Drawing Sheets

Related U.S. Application Data continuation of application No. 14/114,129, filed as application No. PCT/JP2012/061381 on Apr. 27, 2012, now Pat. No. 9,277,045.

(51) Int. Cl.
*G06F 3/0487* (2013.01)
*G06F 3/0488* (2013.01)
*G06F 1/16* (2006.01)

(52) U.S. Cl.
CPC .......... *G06F 3/0487* (2013.01); *G06F 3/0488* (2013.01); *G06F 3/04886* (2013.01); *H04M 1/72569* (2013.01); *G06F 2203/04806* (2013.01); *G06F 2203/04808* (2013.01)

(58) Field of Classification Search
USPC .......................................... 455/566; 345/173
See application file for complete search history.

(56) References Cited

U.S. PATENT DOCUMENTS

| | | |
|---|---|---|
| 2002/0149561 A1 | 10/2002 | Fukumoto |
| 2004/0121758 A1 | 6/2004 | Hoche |
| 2005/0184972 A1 | 8/2005 | Tashiro |
| 2006/0109252 A1 | 5/2006 | Kolmykov-Zotov |
| 2006/0111093 A1 | 5/2006 | Shim et al. |
| 2006/0197750 A1 | 9/2006 | Kerr et al. |
| 2007/0024736 A1 | 2/2007 | Matsuda et al. |
| 2007/0152976 A1 | 7/2007 | Townsend |
| 2008/0158185 A1 | 7/2008 | Westerman |
| 2009/0174679 A1 | 7/2009 | Westerman |
| 2010/0153227 A1 | 6/2010 | Medvinsky |
| 2010/0173679 A1 | 7/2010 | Moon |
| 2010/0216439 A1 | 8/2010 | Marcelli |
| 2011/0018835 A1 | 1/2011 | Murai |
| 2011/0102357 A1 | 5/2011 | Kajitani |
| 2012/0223906 A1 | 9/2012 | Zhou |
| 2012/0262407 A1 | 10/2012 | Hinckley |
| 2012/0276958 A1 | 11/2012 | Inami |
| 2012/0299856 A1 | 11/2012 | Hasui |
| 2013/0234982 A1 | 9/2013 | Kang |
| 2014/0024337 A1 | 1/2014 | Fang |

FOREIGN PATENT DOCUMENTS

| | | |
|---|---|---|
| JP | 2000039964 A | 2/2000 |
| JP | 2003308130 A | 10/2003 |
| JP | 2005234993 A | 9/2005 |
| JP | 2007221184 A | 8/2007 |
| JP | 2009080683 A | 4/2009 |
| JP | 2010009335 A | 1/2010 |
| JP | 2010009514 A | 1/2010 |
| JP | 2010044567 A | 2/2010 |
| JP | 2010066918 A | 3/2010 |
| JP | 2010154090 A | 7/2010 |
| JP | 2010165174 A | 7/2010 |
| JP | 2011008111 A | 1/2011 |
| JP | 2011028603 A | 2/2011 |
| JP | 2011034196 A | 2/2011 |
| JP | 2011039990 A | 2/2011 |
| JP | 2011237945 A | 11/2011 |
| JP | 2012008923 A | 1/2012 |
| JP | 2012234386 A | 11/2012 |
| WO | 2010047048 A1 | 4/2010 |

OTHER PUBLICATIONS

Communication dated Jun. 27, 2017 from the Japanese Patent Office in counterpart application No. 2016-187563.
Communication dated Feb. 21, 2017 issued by the Japanese Patent Office in counterpart Japanese application No. 2015-176719.
Communication dated Jul. 26, 2016, from the Japanese Patent Office in counterpart application No. 2015-176719.
Communication dated Apr. 24, 2015 from the Japanese Patent Office in counterpart Japanese application No. 2011102784.
Communication dated Aug. 27, 2014 from the European Patent Office in counterpart European Patent Application No. 12779973.2.
International Search Report of PCT/JP2012/061381, dated Jun. 5, 2012.

FIG. 4
(A)
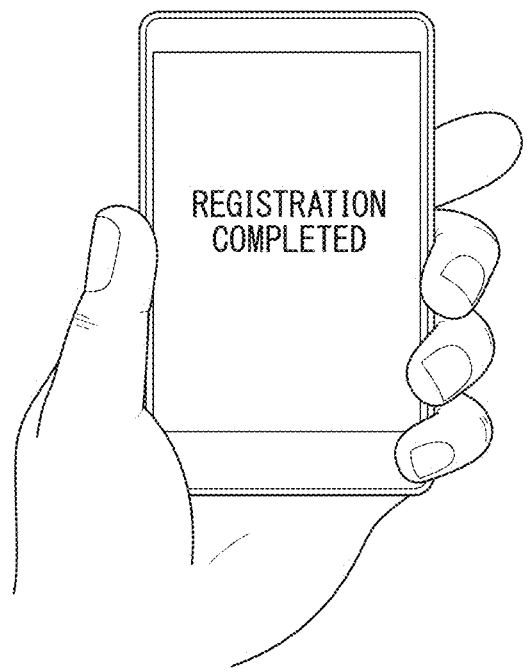
(B)

FIG. 8
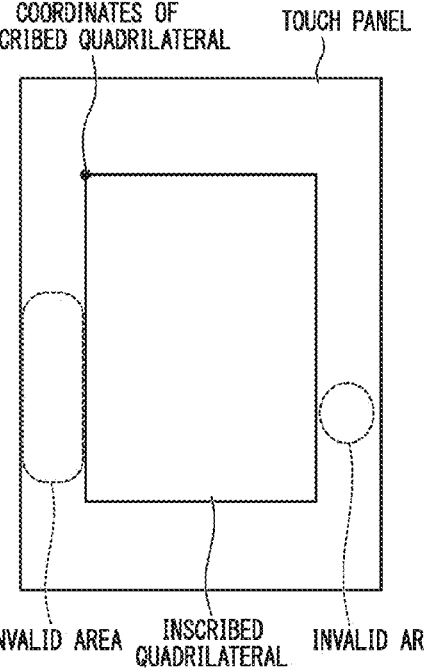
(A)
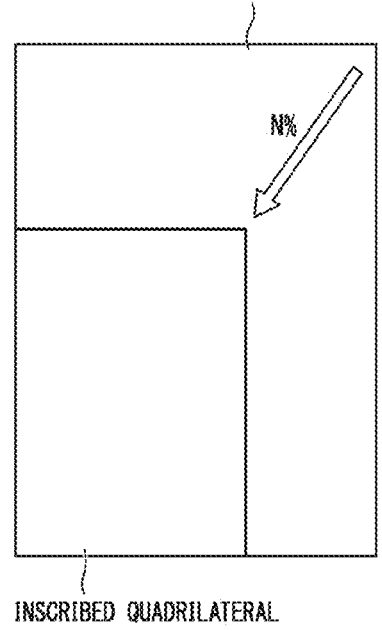
(B)
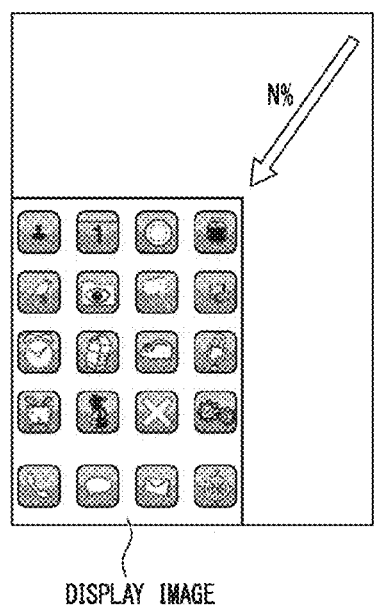
(C)
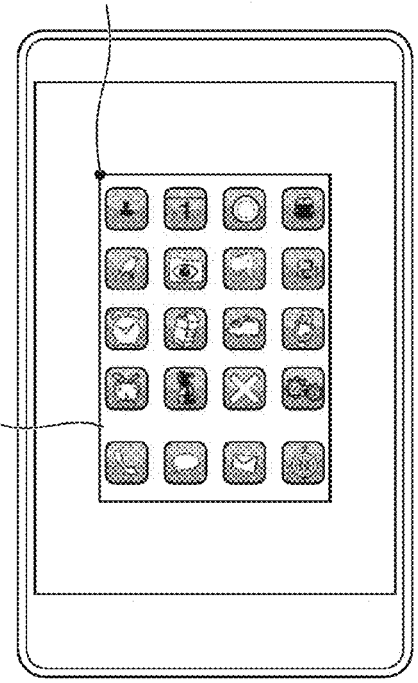
(D)

INVALID AREA SPECIFYING METHOD FOR TOUCH PANEL OF MOBILE TERMINAL

This is a Continuation of U.S. application Ser. No. 15/002,467 filed Jan. 21, 2016, which is a Continuation of U.S. application Ser. No. 14/114,129 filed Oct. 25, 2013, now U.S. Pat. No. 9,277,045, issued Mar. 1, 2016, which is a National Stage of International Application No. PCT/JP2012/061381, filed on Apr. 27, 2012, which claims priority on Japanese Patent Application No. 2011-102784 filed May 2, 2011, the entire content of which is incorporated herein by reference.

TECHNICAL FIELD

The present invention relates to a touch-panel cellular phone and an input operation method.

BACKGROUND ART

Recently, cellular phones having touch-panel input devices have been spread all over the world. Touch panels are combinations of display devices such as LCD (Liquid Crystal Display) and input devices such as touch pads. Touch-panel cellular phones guarantee intuitive operations for users to touch the touch panels with fingers without complex operations needed; hence, they are favorable for users in comparison with conventional cellular phones needing operations with buttons and switches.

Recent cellular phones incorporate touch panels covering the entire surfaces of cellular phones with large screen sizes. Since the entire surface screens of touch panels function as input devices, users holding cellular phones while touching the touch panels with fingers or hands may cause error operations to be accepted by cellular phones. To prevent error operations, cellular phones can be designed not to accept an operation at a second touch position when a user concurrently touches two positions on a touch panel. This type of cellular phones may incur another possibility in that, when a touch panel is touched by a user's finger or a user's hand holding a cellular phone, the cellular phone cannot recognize a user's operation of touching the touch panel of the cellular phone with the other finger or the other hand. Additionally, when a user holds a cellular phone without touching a touch panel with a finger or a hand, a cellular phone may be hardly maintained at a desired position in space and become unstable in positioning, thus incurring the possibility that the user may drop the cellular phone on the floor by mistake.

Various technologies have been developed to solve the above problems. For example, Patent Literature 1 discloses a touch-panel information processing device, which executes a function assigned to a touch area on a touch panel when an amount of a touch time a user touches the touch panel with a finger or a hand does not reach a predetermined time but which does not execute the function assigned to the touch area on the touch panel when an amount of a touch time the user touches the touch panel reaches the predetermined time. This is based on a prediction that, when a user holding a cellular phone touches a touch panel with a finger or a hand, the user may be touching the touch panel with a finger for a longer period of time than a touch time assigned to a normal input operation. For this reason, it is possible to reduce the frequency of a user's error operations on a touch panel by use of the method disclosed in Patent Literature 1.

Patent Literature 2 discloses a touch-panel cellular phone, which makes it easy for a user to operate a touch panel with a user's finger or a user's hand holding a cellular phone because the cellular phone is equipped with a plurality of sensors used for detecting a holding position of the cellular phone in the longitudinal direction so as to shift a key display area and display it on the touch panel in correspondence with the holding position.

CITATION LIST

Patent Literature

Patent Literature 1: Japanese Patent Application Publication No. 2011-39990
Patent Literature 2: Japanese Patent Application Publication No. 2010-154090

SUMMARY OF INVENTION

Technical Problem

The input operation method disclosed in Patent Literature 1 is applicable to an input operation in which any key displayed on a touch panel is operated for a short touch time but inapplicable to another input operation such as a handwriting input operation needing a long touch time.

The present invention is made in consideration of the aforementioned circumstances, wherein it is an object of the invention to provide a cellular phone and an input operation method which are able to prevent an error operation in which a user's finger or a user's hand holding the cellular phone touches a touch panel by mistake irrespective of a touch time on the touch panel.

Solution to Problem

The present invention provides a touch-panel cellular phone including an invalid area specifying part used for specifying an invalid area which does not accept a user's input operation on a touch panel and an input part which detects a user's touch area on the touch panel so as to execute a function pre-assigned to the touch area which is not encompassed by the invalid area.

Additionally, the present invention provides an input operation method for a touch-panel cellular phone, including the steps of specifying an invalid area which does not accept a user's input operation on a touch panel; detecting a user's touch area on the touch panel; and executing a function pre-assigned to the touch area which is not encompassed by the invalid area.

Moreover, the present invention provides a program which causes a computer controlling an input operation on a touch panel to implement the above input operation method.

Advantageous Effects of Invention

According to the present invention, it is possible to prevent an error operation due a user holding a cellular phone and inadvertently touching a touch panel with a finger or a hand. The input operation method of the present invention does not need complex processing used for accepting an input operation in response to a time of a user touching a touch panel, hence, it is possible to reliably prevent an error operation on a touch panel with a simple configuration and process. Additionally, it is possible to realize an optimum display of images for each user when images are displayed in reduced sizes to circumvent an invalid area, which is set for each user holding a cellular phone, on a touch panel.

BRIEF DESCRIPTION OF DRAWINGS

FIG. 4 includes front views showing messages displayed on the touch panel of the cellular phone according to the invalid area setting process shown in FIG. 3.

FIG. 8 shows states of images being reduced in sizes and displayed on the touch panel of the cellular phone.

DESCRIPTION OF EMBODIMENTS

A touch-panel cellular phone and an input operation method according to the present invention will be described by way of examples with reference to the accompanying drawings.

First Embodiment

Figure 1:
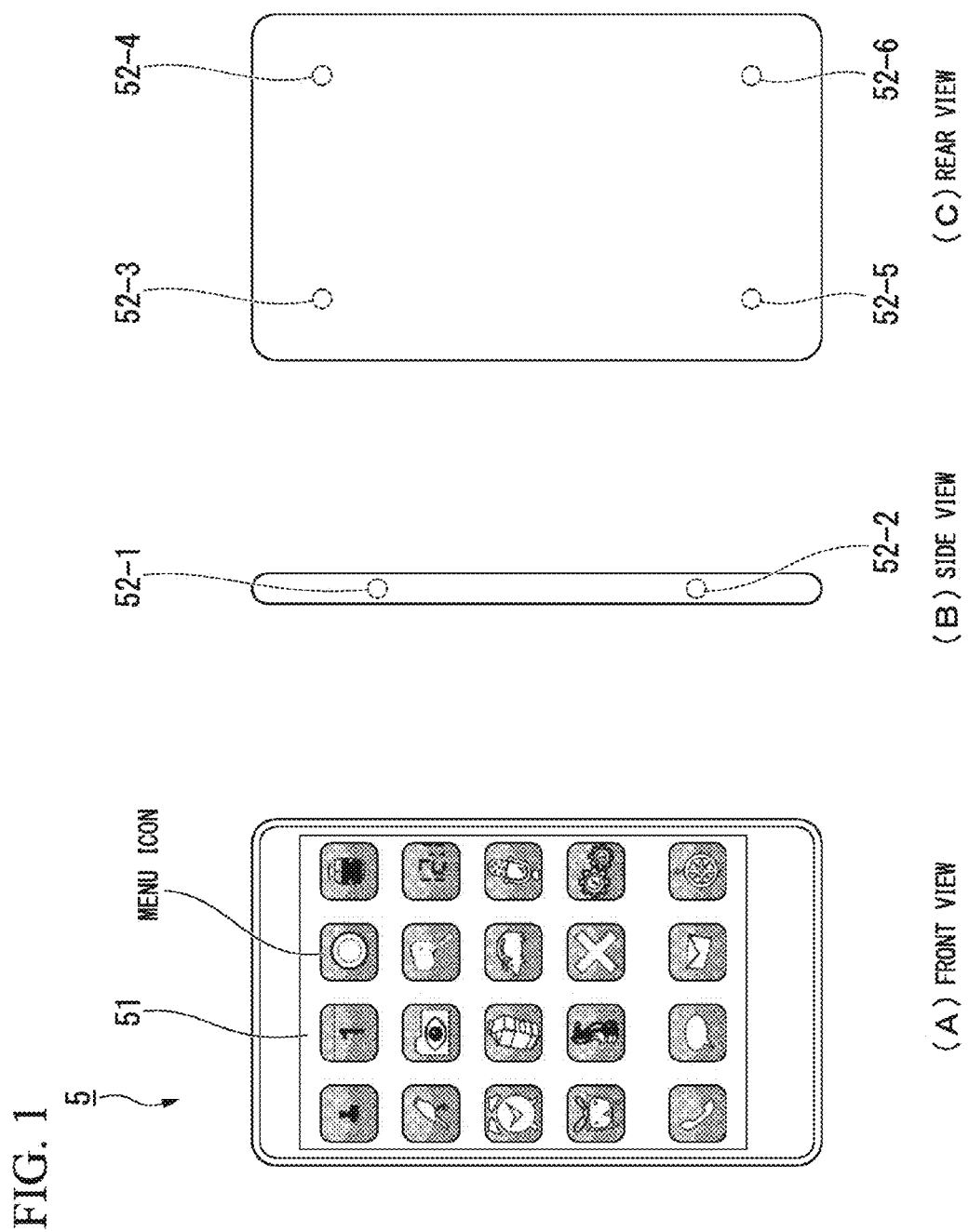
FIG. 1 includes a front view, a side view, and a rear view showing the exterior appearance of a cellular phone according to a first embodiment of the present invention.

FIG. 1 shows the exterior appearance of a cellular phone 5 according to the first embodiment of the present invention. In FIG. 1, (A) is a front view of the cellular phone 5; (B) is a side view of the cellular phone 5; and (C) is a rear view of the cellular phone 5.

A touch panel 51 used for accepting a user's operation is arranged on the front face of the cellular phone 5. The touch panel 51 is configured of a display device such as an LCD and an input device such as a touch pad so as to display predetermined images and accept touch operations with a user's fingers and hands. As the touch panel 51, for example, it is possible to use an electrostatic-capacity touch panel implementing multiple-touch detection ability. A plurality of menu icons pre-assigned to an initial screen of the cellular phone 5 is displayed on the touch panel 51.

The cellular phone 5 is equipped with a plurality of sensors 52. Specifically, sensors 52-1 and 52-2 are arranged on the side face of the cellular phone 5, while sensors 52-3 to 52-6 are arranged on the rear face of the cellular phone 5. These sensors 52 are used to detect that a user is holding and touching the cellular phone 5 with fingers or hands, wherein each sensor 52 is turned on when touched but turned off when not touched.

Figure 2:
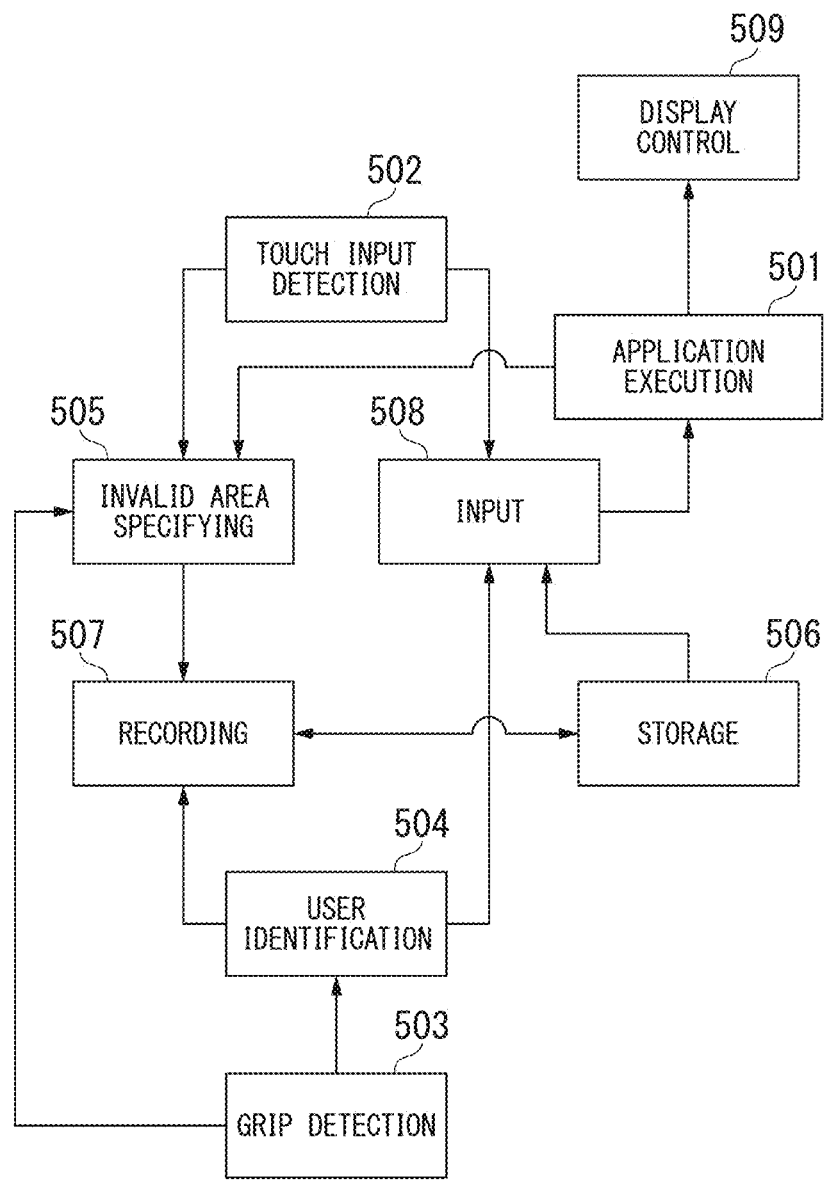
FIG. 2 is a functional block diagram of the cellular phone of the first embodiment.

FIG. 2 is a functional block diagram of the cellular phone 5 of the first embodiment. FIG. 1 does not include an illustration of a microcomputer (or a computer system) which is embedded inside the cellular phone 5. Using a computer system which reads and executes programs stored in computer-readable storage media, it is possible to implement an application execution part 501, a touch input detection part 502, a grip detection part 503, a user identification part 504, an invalid area specifying part 505, a storage unit 506, a recording part 507, an input part 508, and a display control part 509. Herein, computer-readable storage media denotes magnetic disks, magneto-optical disks. CD-ROM, DVD-ROM, and semiconductor memories.

The application execution part 501 executes an application program stored in a storage medium of the cellular phone 5. The application program includes at least an invalid area setting application. The touch input detection part 502 determines whether or not a user touches the touch panel 51 so as to detect a touch area as an area of coordinates being touched by a user on the touch panel 51. The grip detection part 503 determines whether or not the cellular phone 5 is being held by user's fingers or a user's hand based on the ON/OFF information of the sensors 52. The user identification part 504 retrieves user identification information based on the ON/OFF information of the sensors 52.

The invalid area specifying part 505 specifies an invalid area as a touch area detected by the touch input detection part 502 when the application execution part 501 executes the invalid area setting application.

The storage unit 506 stores the user identification information retrieved by the user identification part 504 in connection with the invalid area specified by the invalid area specifying part 505. The recording part 507 records the user identification information retrieved by the user identification part 504 in connection with the invalid area which is specified by the invalid area specifying part 505.

The input part 508 notifies the application execution part 501 of the touch area which is detected by the touch input detection part 502 but which is not encompassed by the invalid area stored in the storage unit 506. The display control part 509 accepts the screen information from the application execution part 501 so as to display the screen information on the touch panel 51.

Next, the operation of the cellular phone 5 of the first embodiment will be described.

Figure 3:
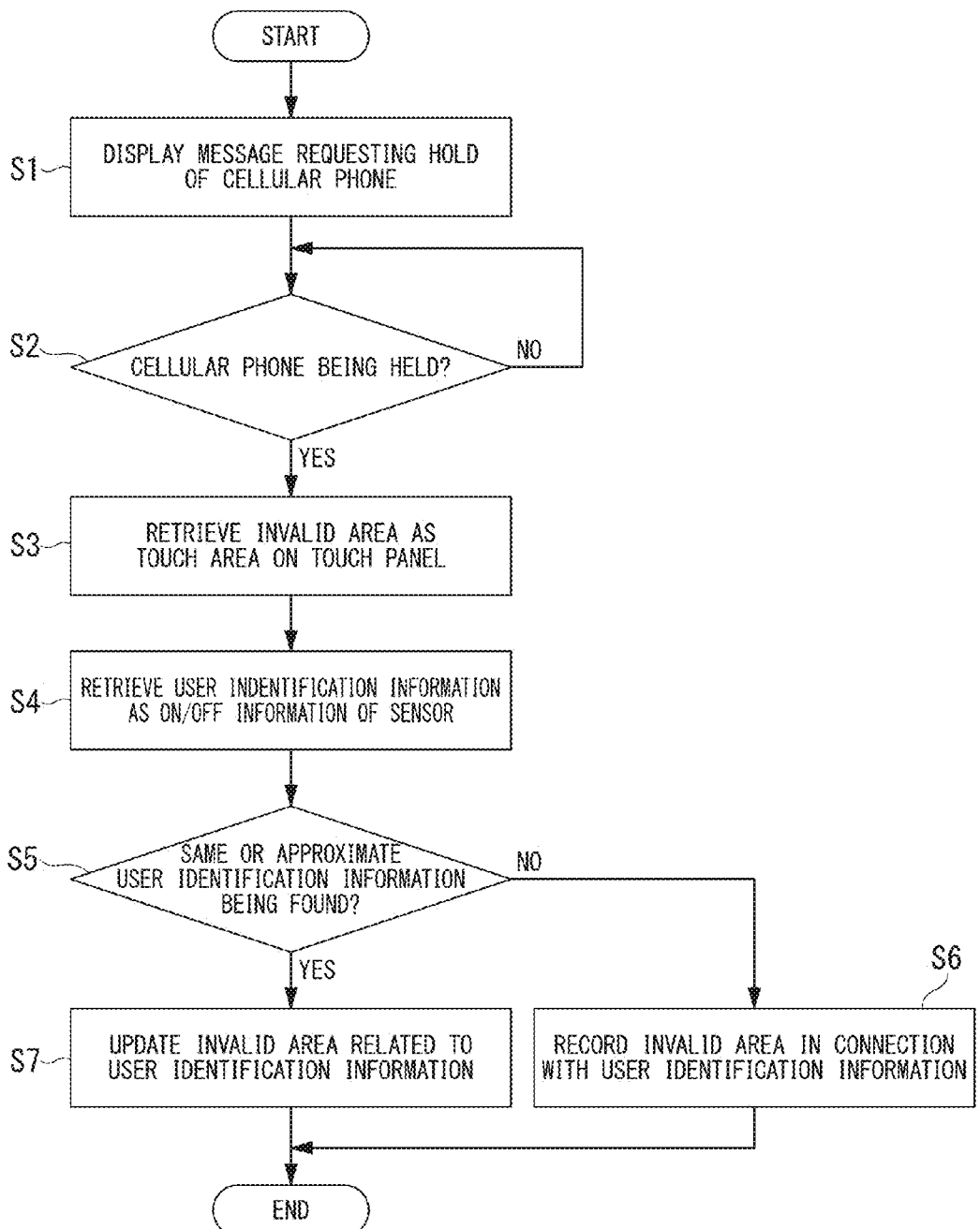
FIG. 3 is a flowchart showing an invalid area setting process in the cellular phone of the first embodiment.

First, the invalid area setting process of the cellular phone 5 will be described. FIG. 3 is a flowchart showing the invalid area setting process of the cellular phone 5. The application execution part 501 executes the invalid area setting application when a user touches a menu icon, representing the invalid area setting application, displayed on the touch panel 51 with a finger. When starting the invalid area setting application, the application execution part 501 sends an instruction to display a message which requests a user to hold the cellular phone 5, e.g. "PLEASE HOLD WITH HAND", to the display control part 509. As shown in FIG. 4(A), the display control part 509 displays a message received from the application execution part 501 on the touch panel 51 (step S1). FIG. 4 shows messages which are displayed on the touch panel 51 of the cellular phone 5 at an invalid area setting mode.

When the display control part 509 displays a message, shown in FIG. 4(A), on the touch panel 51, the grip detection part 503 determines whether or not a user holds the cellular phone 5 with a finger or a hand (step S2). Specifically, a decision as to whether or not a user holds the cellular phone 5 depends on a decision as to whether or not any one of the sensors 52 is turned on. When the grip detection part 503 determines that a user does not hold the cellular phone 5 (i.e. a decision result "NO" in step S2), the flow returns to step S2 so as to repeat step S2 until any one of the sensors 52 is turned on.

Upon detecting a user's grip of the cellular phone 5 (i.e. a decision result "YES" in step S2), the grip detection part 503 sends a grip detection signal to the user identification part 504 and the invalid area specifying part 505. Upon receiving the grip detection signal from the grip detection part 503, the invalid area specifying part 505 retrieves the touch area on the touch panel 51 which is currently detected by the touch input detection part 502 (step S3), thus notifying the recording part 507 of the touch area as the invalid area. Upon detecting the grip detection signal from the grip detection part 503, the user identification part 504 obtains the user identification information as the ON/OFF information of each sensor 52 (step S4) so as to send the user identification information to the recording part 507.

The recording part 507 determines whether or not the storage unit 506 stores the user identification information identical to or approximately equal to the user identification information identified by the user identification part 504 (step S5). The storage unit 506 stores the user identification information reflecting the ON/OFF information of the sensors 52. Therefore, the recording part 507 determines whether or not the storage unit 506 stores the user identification information matching with the ON/OFF information of each sensor 52. The recording part 507 determines that the user identification information, which reflects the ON/OFF information of the sensors 52 but in which the number of pieces of unmatched ON/OFF information is less than a threshold (e.g. one), is identical to or approximately equal to the user identification information identified by the user identification part 504.

Upon determining that the storage unit 506 does not store the user identification information identical to or approximately equal to the user identification information identified by the user identification part 504 (i.e. a decision result "NO" in step S5), the recording part 507 stores the user identification information identified by the user identification part 504 in the storage part 506 in connection with the invalid area specified by the invalid area specifying part 505 (step S6).

Upon determining that the storage unit 506 stores the user identification information identical to or approximately equal to the user identification information specified by the user identification part 504 (i.e. a decision result "YES" in step S5), the recording part 507 rewrites the invalid area, which is stored in the storage unit 506 in connection with the user identification information, with the invalid area specified by the invalid area specifying part 505 (step S7).

When the recording part 507 updates the invalid area in the storage unit 506, the application execution part 501 sends an instruction to display a message representing the end of the invalid area setting application, e.g. "REGISTRATION COMPLETED", on the touch panel 51 to the display control part 509. As shown in FIG. 4(B), the display control part 509 displays a message received from the application execution part 501 on the touch panel 51. Thereafter, the application execution part 501 exits the invalid area setting application.

Figure 5:
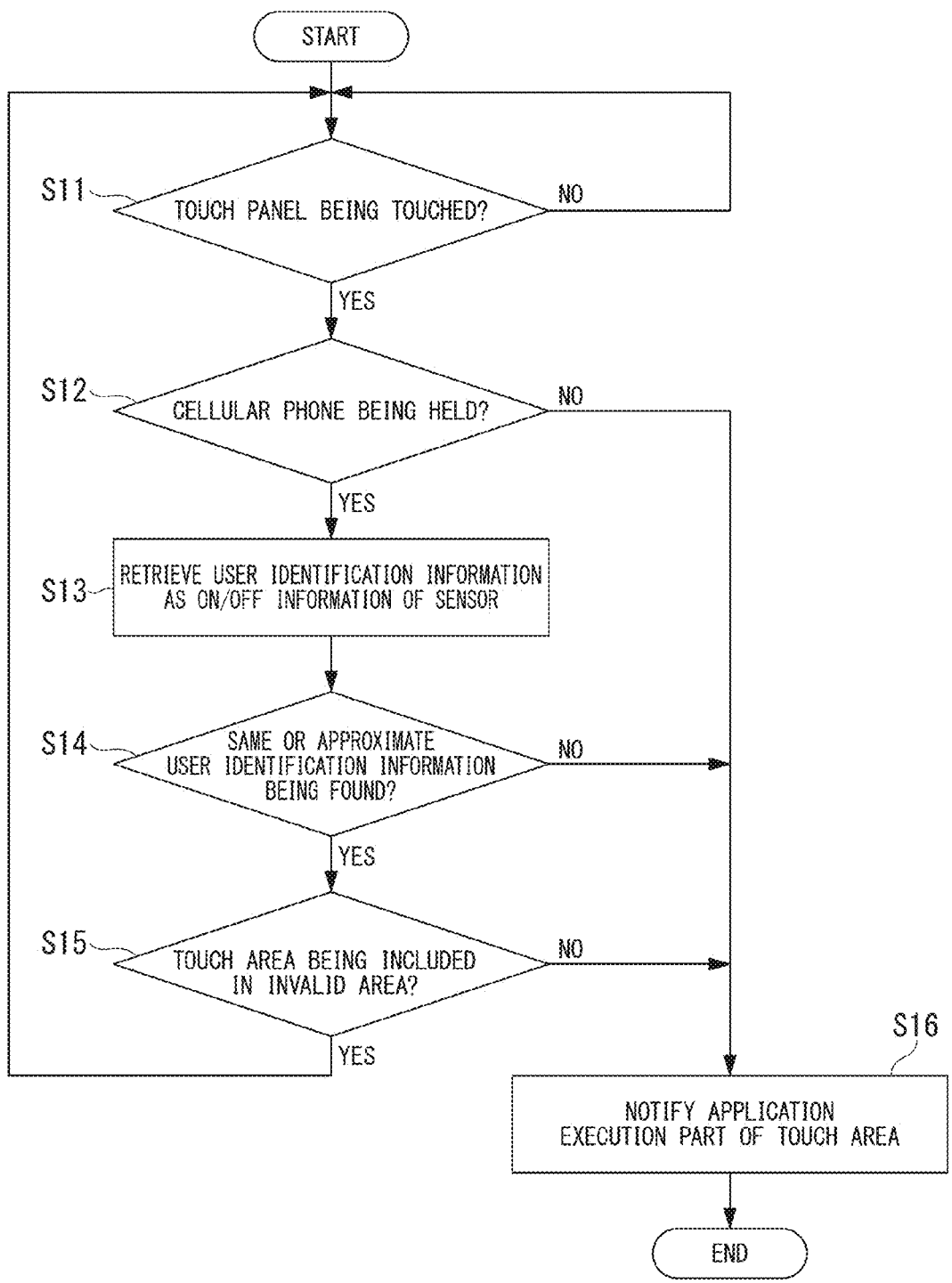
FIG. 5 is a flowchart showing the operation of the cellular phone after the invalid area setting process.

Next, the operation of the cellular phone 5 after the invalid area setting process shown in FIG. 3 will be described. FIG. 5 is a flowchart showing the operation of the cellular phone 5 after the invalid area setting process.

After exiting the invalid area setting application to set the invalid area to the touch panel 51, the touch input detection part 502 determines whether or not a user touches the touch panel 51 in an acceptable state to accept an operation of an application managed by the application execution part 501 (step S11). Upon determining that a user does not touch the touch panel 51 (i.e. a decision result "NO" in step S11), the flow returns to step S11 so as to repeat step S11 until the touch input detection part 502 detects a user's touch on the touch panel 51.

Upon detecting a user's touch on the touch panel 51 (i.e. a decision result "YES" in step S11), the touch input detection part 502 sends the coordinates of the touch area on the touch panel 51 to the input part 508. Thereafter, the grip detection part 503 determines whether or not a user holds the cellular phone 5 (step S12).

Upon determining a user's grip of the cellular phone 5 (i.e. a decision result "YES" in step S12), the user identification part 504 retrieves the user identification information as the ON/OFF information of each sensor 52 so as to send it to the input part 508 (step S13).

The input part 508 determines whether or not the storage unit 506 stores the user identification information identical to or approximately equal to the user identification information identified by the user identification part 504 (step S14). Upon determining that the storage unit 506 stores the user identification information identical to or approximately equal to the user identification information identified by the user identification part 504 (i.e. a decision result "YES" in step S14), the input part 508 reads the invalid area, which is connected to the user identification information, from the storage part 506. Thereafter, the input part 508 determines whether or not the touch area detected by the touch input detection part 502 is encompassed by the invalid area read from the storage unit 506 (step S15).

Upon determining that the touch area detected by the touch input detection part 502 is encompassed by the invalid area read from the storage unit 506 (i.e. a decision result "YES" in step S15), the input part 508 does not handle a user's input operation on the touch area, whereby the flow returns to step S11, and therefore the touch input detection part 502 determines again whether or not a user touches the touch panel 51.

When the grip detection part 503 determines that the cellular phone 5 is not held by a user (i.e. a decision result "NO" in step S12), when the input part 508 determines that the storage unit 506 does not store the user identification information identical to or approximately equal to the user identification information identified by the user identification part 504 (i.e. a decision result "NO" in step S14), or when the input part 508 determines that the touch area detected by the touch input detection part 502 is not encompassed by the invalid area read from the storage unit 506 (i.e. a decision result "NO" in step S15), the input part 508 notifies the application execution part 501 of the touch area detected by the touch input detection part 502 (step S16).

The cellular phone 5 of the first embodiment does not regard a user's finger touching the pre-recorded invalid area as an input operation. That is, it is possible to prevent an error operation (i.e. an input operation mistake) due to an event in which a user holding the cellular phone 5 with a hand inadvertently touches the touch panel 51 regardless of the amount of time a user touches the touch panel 51.

The first embodiment is designed to store the invalid area for each user in the storage unit 506 in connection with the user identification information. Since the cellular phone 5 is registered with the invalid area suited to the holding method for each user in advance, the input part 508 is able to determine whether an input operation is valid or invalid based on the invalid area for each user.

The first embodiment employs the user identification information as the ON/OFF information of the sensors 52; but this is not a restriction. For example, it is possible to employ the user identification information as a user ID. However, it is possible to improve usability in the first embodiment employing the user identification information as the ON/OFF information of the sensors 52 because the cellular phone 5 is able to automatically retrieve the user identification information without needing an input process of a user ID.

Second Embodiment

Next, the second embodiment of the present invention will be described. The second embodiment adapted to the cellular phone 5 differs from the first embodiment in that it implements a function of automatically aligning display areas of menu icons outside the invalid area and a function of displaying menu icons with reduced sizes.

Figure 6:
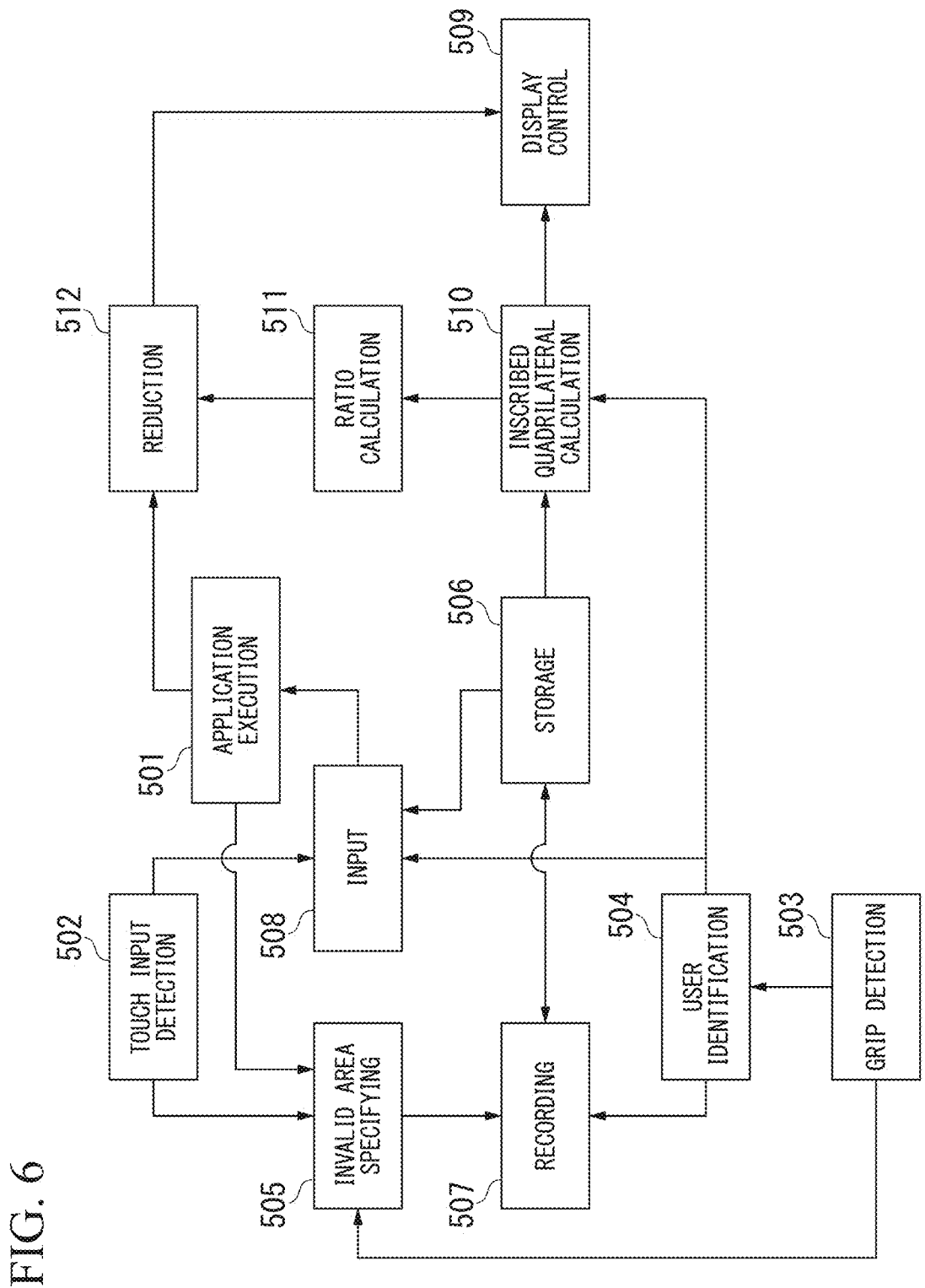
FIG. 6 is a block diagram of a cellular phone according to a second embodiment of the present invention.

FIG. 6 is a functional block diagram of the cellular phone 5 according to the second embodiment of the present invention. The cellular phone 5 of the second embodiment includes an inscribed quadrilateral calculation part 510, a ratio calculation part 511, and a reduction part 512 in addition to the constituent elements 501 to 509 of the first embodiment shown in FIG. 1.

The inscribed quadrilateral calculation part 510 presumes a quadrilateral having the same aspect ratio as the touch panel 51, which is inscribed in the display area unmatched with the invalid area, so as to calculate the coordinates and the size of the quadrilateral. The ratio calculation part 511 calculates the ratio of the size of the quadrilateral, calculated by the inscribed quadrilateral calculation part 510, to the size of the touch panel 51. The reduction part 512 retrieves an image displayed on the touch panel 51 from the application execution part 501 so as to reduce the image with the ratio calculated by the ratio calculation part 511.

Next, the operation of the cellular phone 5 of the second embodiment will be described.

Figure 7:
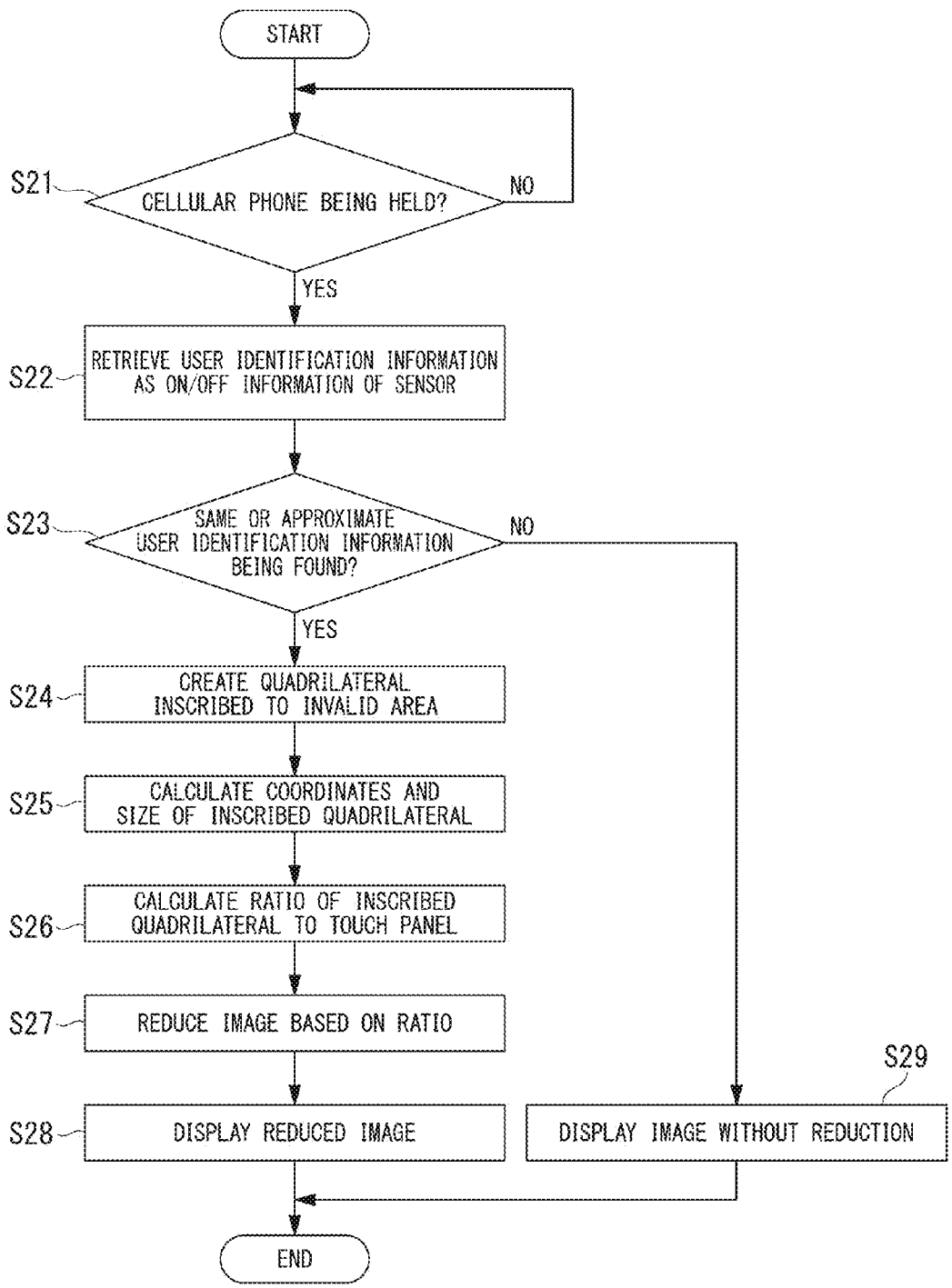
FIG. 7 is a flowchart showing the operation of the cellular phone of the second embodiment after the invalid area setting process.

The second embodiment executes the same invalid area setting process as the first embodiment, hence, detailed descriptions thereof will be omitted here. The second embodiment illustrates the operation of the cellular phone 5 after the invalid area setting process. FIG. 7 is a flowchart showing the operation of the cellular phone 5 of the second embodiment after the invalid area setting process.

Upon completing the invalid area setting application setting the invalid area on the touch panel 51, the grip detection part 503 determines whether or not the cellular phone 5 is being held by a user (step S21). When the grip detection part 503 determines that the cellular phone 5 is being held by a user (i.e. a decision result "YES" in step S21), the user identification part 504 retrieves the user identification information as the ON/OFF information of the sensors 52 so as to send it to the inscribed quadrilateral calculation part 510 (step S22).

The inscribed quadrilateral calculation part 510 determines whether or not the storage unit 506 stores the user identification information identical to or approximately equal to the user identification information identified by the user identification part 504 (step S23). Upon determining that the storage unit 506 stores the user identification information identical to or approximately equal to the user identification information identified by the user identification part 504 (i.e. a decision result "YES" in step S23), the inscribed quadrilateral calculation part 510 reads the invalid area related to the user identification information from the storage unit 506.

The inscribed quadrilateral calculation part 510 produces a quadrilateral having the same aspect ratio as the touch panel 51, which is inscribed to the display area precluding the invalid area on the touch panel 51 (step S24). The inscribed quadrilateral calculation part 510 calculates the size and the coordinates (e.g. coordinates at an upper-left corner) of the inscribed quadrilateral (step S25). The ratio calculation part 11 calculates the ratio of the inscribed quadrilateral to the display area on the touch panel 51 (step S26). The reduction part 512 retrieves an image displayed on the touch panel 51 from the application execution part 501 so as to reduce the image with the ratio calculated by the ratio calculation part 511 (step S27). The display control part 509 retrieves the image reduced by the reduction part 512 so as to display the reduced image inside the inscribed quadrilateral based on the coordinates calculated by the inscribed quadrilateral calculation part 510 (step S28).

FIG. 8 shows the states of the cellular phone 5 used to display images (i.e. menu icons) which are being reduced in sizes on the touch panel 51.

FIG. 8(A) shows an inscribed quadrilateral which is created in the center area, precluding invalid areas, interposed between the left and right sides on the touch panel 51. FIG. 8(B) shows an inscribed quadrilateral which is reduced with a reduction ratio N % and which is moved towards the lower-left corner on the touch panel 51. FIG. 8(C) shows reduced images displayed inside the inscribed quadrilateral shown in FIG. 8(B). FIG. 8(D) shows reduced images displayed inside the quadrilateral shown in FIG. 8(A).

When the inscribed quadrilateral calculation part 510 determines that the storage unit 506 does not store the user identification information identical to or approximately equal to the user identification information identified by the user identification part 504 in step S23 of FIG. 7 (i.e. a decision result "NO" in step S23), the ratio calculation part 511 does not need to calculate a reduction ratio for images, wherein the reduction part 512 retrieves images from the application execution part 501 so as to directly send them to the display control part 509 (step S29).

The cellular phone 5 of the second embodiment is able to reduce and display the display areas of images not overlapped with the invalid areas on the touch panel 51. Thus, it is possible to reduce and display a part of images, which are hidden with user's fingers or a user's hand holding the cellular phone 5, at an easy-to-see position in a user's view.

It is possible to modify the first and second embodiment in such a way that a microcomputer (or a computer system) embedded in the cellular phone 5 reads a program from a computer-readable storage medium so as to execute the foregoing processes. This program can be drafted in the form combined with a main program pre-installed in a computer system, e.g. a differential file (or a differential program). Alternatively, this program can be downloaded to a computer system via a communication line, and therefore the computer system may execute the program.

Lastly, the present invention is not limited to the foregoing embodiments, which may embrace a variety of modifications and design changes within the scope of the invention defined by the appended claims.

INDUSTRIAL APPLICABILITY

The present invention is able to automatically display images, which are hidden with user's fingers or a user's hand in a touch-panel cellular phone, at a desired position on a touch panel with a desired reduction ratio, and related to the technology which guarantees a display device to display images while freely changing their positions and sizes based on the detection results of sensors; hence, the present invention is not necessarily limited to handheld information terminals but applicable to any electronic devices equipped with displays and sensors.

REFERENCE SIGNS LIST 1 cellular phone
51 touch panel
52 sensor
501 application execution part
502 touch input detection part
503 grip detection part
504 user identification part
505 invalid area specifying part
506 storage unit
507 recording part
508 input part
509 display control part
510 inscribed quadrilateral calculation part
511 ratio calculation part
512 reduction part

The invention claimed is:

1. A mobile terminal comprising:
a determination part configured to determine a state of the mobile terminal according to a predetermined operation;
a touch panel comprising a screen, the screen being able to have an invalid area set thereon;
an application execution part configured to execute an invalid area setting application for specifying the invalid area based on touch information provided to the touch panel;
a recording part configured to record on a storage unit a coordination between a specified invalid area and a determination result determined by the determination part for each determined state determined by the determination part; and
an input part configured to determine whether an input to the touch panel relates to an invalid area which is set in coordination with a determination result of the determination part,
wherein upon finding a coordination between a specified invalid area and a determination result of the determination part stored on the storage unit during execution of the invalid area setting application, the recording part rewrites the invalid area coordinated with the determination result stored on the storage unit.

2. The mobile terminal according to claim 1, wherein the invalid area setting application displays on the touch panel a message indicating that the invalid area is specified based on the touch information provided to the touch panel due to execution of the invalid area setting application.

3. The mobile terminal according to claim 1, wherein the touch information provided to the touch panel is indicated by a plurality of contact areas.

4. The mobile terminal according to claim 1, wherein the invalid area setting application displays display information on the touch panel, the display information generated based on the invalid area coordinated with the determination result of the determination part.

5. The mobile terminal according to claim 4, further comprising a calculation part configured to generate a quadrilateral area based on the invalid area coordinated with the determination result of the determination part,
wherein the invalid area setting application specifies the invalid area based on a calculation result of the calculation part.

6. The mobile terminal according to claim 1, wherein the state of the mobile terminal is identified by identification information according to the predetermined operation.

7. The mobile terminal according to claim 1, wherein the determination part selects one state of the mobile terminal among multiple states of the mobile terminal determined thereby.

8. The mobile terminal according to claim 7, wherein the recording part records a coordination between each of multiple states of the mobile terminal and a corresponding invalid area on the storage unit.

9. An invalid area specifying method comprising:
determining a state of a mobile terminal according to a predetermined operation of the mobile terminal;
executing an invalid area setting application for specifying an invalid area based on touch information provided to a touch panel of the mobile terminal;
recording on a storage unit a coordination between a specified invalid area and a determination result determined by determining the state of the mobile terminal;
determining whether an input to the touch panel relates to an invalid area which is set in coordination with a determination result of determining a state of the mobile terminal; and
upon finding a coordination between a specified invalid area and a determination result of determining a state of the mobile terminal stored on the storage unit during execution of the invalid area setting application, rewriting the invalid area coordinated with the determination result of determining a state of the mobile terminal stored on the storage unit.

10. A non-transitory storage medium having a stored program for causing a computer of a mobile terminal to implement:
determining a state of the mobile terminal according to a predetermined operation of the mobile terminal;
executing an invalid area setting application for specifying an invalid area based on touch information provided to the touch panel of the mobile terminal;
recording on a storage unit a coordination between a specified invalid area and a determination result determined by determining the state of the mobile terminal;
determining whether an input to the touch panel relates to an invalid area which is set in coordination with a determination result of determining a state of the mobile terminal; and
upon finding a coordination between a specified invalid area and a determination result of determining a state of the mobile terminal stored on the storage unit during execution of the invalid area setting application, rewriting the invalid area coordinated with the determination result of determining a state of the mobile terminal stored on the storage unit.

* * * * *

UNITED STATES PATENT AND TRADEMARK OFFICE
CERTIFICATE OF CORRECTION

PATENT NO.        : 10,135,967 B2
APPLICATION NO.   : 15/819026
DATED             : November 20, 2018
INVENTOR(S)       : Tomoya Makiguchi It is certified that error appears in the above-identified patent and that said Letters Patent is hereby corrected as shown below:

In the Claims

Column 10, Line 36; In Claim 10, after "non-transitory", insert --computer-readable--

Signed and Sealed this
Ninth Day of April, 2019

Andrei Iancu
*Director of the United States Patent and Trademark Office*